(12) United States Patent
Guest

(10) Patent No.: US 9,909,701 B2
(45) Date of Patent: Mar. 6, 2018

(54) TUBE COUPLINGS

(71) Applicant: John Guest International Limited, Middlesex (GB)

(72) Inventor: Timothy Steven Guest, Bray (GB)

(73) Assignee: John Guest International Limited, Middlesex (GB)

( * ) Notice: Subject to any disclaimer, the term of this patent is extended or adjusted under 35 U.S.C. 154(b) by 1351 days.

(21) Appl. No.: 13/852,791

(22) Filed: Mar. 28, 2013

(65) Prior Publication Data

US 2013/0257036 A1 Oct. 3, 2013

(30) Foreign Application Priority Data

Mar. 29, 2012 (GB) .................................. 1205575.2

(51) Int. Cl.
*F16L 37/00* (2006.01)
*F16L 37/092* (2006.01)

(52) U.S. Cl.
CPC ....... *F16L 37/0925* (2013.01); *F16L 2201/10* (2013.01)

(58) Field of Classification Search
USPC ................ 285/243, 257, 305, 319, 322–314, 285/322–324, 39
See application file for complete search history.

(56) References Cited

U.S. PATENT DOCUMENTS

| 3,594,694 | A | * | 7/1971 | Clark | ................... | H01R 13/635 |
| | | | | | | 285/316 |
| 3,727,952 | A | * | 4/1973 | Richardson | ............. | F16L 37/23 |
| | | | | | | 251/149.1 |
| 4,005,883 | A | | 2/1977 | Guest | | |
| 4,154,465 | A | * | 5/1979 | Van Meter | ............ | F16L 55/136 |
| | | | | | | 285/312 |
| 4,411,455 | A | * | 10/1983 | Schnatzmeyer | ...... | F16L 37/084 |
| | | | | | | 166/237 |
| 4,500,117 | A | * | 2/1985 | Ayers | .................... | F16L 19/103 |
| | | | | | | 285/3 |
| 4,573,716 | A | | 3/1986 | Guest | | |
| 4,606,783 | A | | 8/1986 | Guest | | |
| 4,637,636 | A | | 1/1987 | Guest | | |
| 4,645,246 | A | | 2/1987 | Guest | | |
| 4,650,529 | A | | 3/1987 | Guest | | |
| 4,657,286 | A | | 4/1987 | Guest | | |

(Continued)

FOREIGN PATENT DOCUMENTS

EP 0132319 1/1985

*Primary Examiner* — Aaron M Dunwoody
*Assistant Examiner* — Fannie C Kee
(74) *Attorney, Agent, or Firm* — Workman Nydegger

(57) ABSTRACT

A tube coupling to receive and hold a tube includes a coupling body (10) having a throughway to receive a portion of a tube. A collet (17) in the coupling body has legs (21) with outer surfaces that engage with a tapered surface (24) in the coupling body which urges the legs inwardly to resist withdrawal of the tube. A biasing member (26) provides a biasing force without the tube inserted to urge the legs axially onto the tapered surface. The collet (17) can grip a large variety of pipe diameters. The coupling may be supplied with a number of inserts (30A-D) for sealing with the inner diameter of a pipe, the inserts having different diameters. A tool (50) for preparing the end of a pipe to receive the coupling is also contemplated.

11 Claims, 4 Drawing Sheets

(56) References Cited

U.S. PATENT DOCUMENTS

| | | | |
|---|---|---|---|
| 4,722,560 A | 2/1988 | Guest | |
| 4,804,213 A | 2/1989 | Guest | |
| 4,923,220 A | 5/1990 | Guest | |
| 4,946,213 A | 8/1990 | Guest | |
| 4,958,858 A | 9/1990 | Guest | |
| 5,042,848 A * | 8/1991 | Shiozaki | F16L 37/133 285/277 |
| 5,171,045 A * | 12/1992 | Pasbrig | F16L 33/227 285/308 |
| 5,181,751 A * | 1/1993 | Kitamura | F16L 37/092 285/308 |
| 5,209,528 A * | 5/1993 | Weh | F16L 37/121 285/315 |
| 5,284,369 A * | 2/1994 | Kitamura | F16L 37/0985 285/308 |
| 5,370,423 A | 12/1994 | Guest | |
| 5,390,969 A | 2/1995 | Guest | |
| 5,401,064 A | 3/1995 | Guest | |
| 5,443,289 A | 8/1995 | Guest | |
| 5,468,027 A | 11/1995 | Guest | |
| 5,607,193 A | 3/1997 | Guest | |
| 5,683,121 A | 11/1997 | Guest | |
| 5,730,475 A | 3/1998 | Kargula | |
| 5,738,387 A | 4/1998 | Guest | |
| 5,775,742 A | 7/1998 | Guest | |
| 5,779,284 A | 7/1998 | Guest | |
| 5,915,738 A | 6/1999 | Guest | |
| 6,056,326 A | 5/2000 | Guest | |
| 6,073,974 A * | 6/2000 | Meisinger | F16L 37/1215 285/316 |
| 6,173,999 B1 | 1/2001 | Guest | |
| 6,439,620 B1 | 8/2002 | Guest | |
| 6,863,314 B2 | 3/2005 | Guest | |
| 6,880,865 B2 | 4/2005 | Guest | |
| RE38,786 E | 8/2005 | Guest | |
| 6,929,289 B1 | 8/2005 | Guest | |
| 6,957,833 B2 | 10/2005 | Guest | |
| 7,032,932 B2 | 4/2006 | Guest | |
| 7,082,957 B2 | 8/2006 | Guest | |
| 7,100,948 B2 | 9/2006 | Guest | |
| 7,186,371 B1 | 3/2007 | Watling | |
| 7,195,286 B2 * | 3/2007 | Hama | F16L 37/0925 285/307 |
| 7,410,193 B2 | 8/2008 | Guest | |
| 7,425,022 B2 | 9/2008 | Guest | |
| 7,758,085 B2 | 7/2010 | Guest | |
| 8,029,024 B2 * | 10/2011 | Guest | F16L 37/0925 285/314 |
| 8,444,325 B2 | 5/2013 | Guest | |
| 2003/0085568 A1 | 5/2003 | Guest | |
| 2003/0201641 A1 | 10/2003 | Guest | |
| 2006/0181080 A1 | 8/2006 | Guest | |
| 2006/0202478 A1 | 9/2006 | Guest | |
| 2007/0034255 A1 | 2/2007 | Guest | |
| 2007/0034817 A1 | 2/2007 | Guest | |
| 2007/0194568 A1 | 8/2007 | Guest | |
| 2007/0200344 A1 | 8/2007 | Guest | |
| 2008/0136166 A1 | 6/2008 | Guest | |
| 2009/0295152 A1 | 12/2009 | Guest | |
| 2010/0148097 A1 | 6/2010 | Guest et al. | |
| 2011/0309614 A1 | 12/2011 | Guest | |

* cited by examiner

TUBE COUPLINGS

CROSS-REFERENCE TO RELATED APPLICATIONS

This application claims priority to United Kingdom Application No. 1205575.2, filed Mar. 29, 2012, which is incorporated herein by specific reference.

BACKGROUND OF THE INVENTION

1. The Field of the Invention

This invention relates to tube couplings which may be single or multiple tube couplings providing in-line, elbow or T-couplings or tube closures.

2. The Relevant Technology

More specifically, the present invention relates to a tube coupling to receive and hold a tube, the coupling comprising a coupling body having a throughway open at one end to receive a portion of the tube, a collet in the coupling body to allow insertion of the tube into the collet and having a plurality of legs with outer surfaces that engage with a tapered surface in the coupling body which urges the legs inwardly to resist withdrawal of the tube. Such a coupling will subsequently be referred to as "of the kind described".

SUMMARY OF THE INVENTION

A coupling of the kind described is our "Speedfit" connector as disclosed in GB 1 520 742. This coupling has met with significant success over many years. The present invention is designed to extend the use of such a connector.

The connector works on the principle that, as the tube is inserted, the legs of the collet expand radially to allow entry of the tube and, in doing so, grip the tube sufficiently for the collet to be pulled into the tapered surface if the tube is partially withdrawn. As the force increases to remove the tube, the interference between the taper and the collet increases, thereby increasing the grip on the tube.

While this works extremely well, the design is limited to a connection for tubing with a small tolerance. As the diameter of the tube decreases, so does the force with which the collet can grip the tube. If the initial grip is too low, the gripping force is too small to overcome the removal force on the tube.

It is common practice for pipes and connectors to be sold by the same company. Each system has its own size to ensure that system installation remains consistent and to the specification of each company. However, this makes retro fitting difficult as the retro fitter will need to source components from a number of manufacturers, some of whom may no longer be in existence.

According to a first aspect of the present invention, a coupling of the kind described is characterised by a biasing member which provides a biasing force without the tube inserted to urge the legs axially onto the tapered surface.

With such an arrangement, the connector can grip on a much larger variety of pipe outer diameters. The biasing member has the effect of urging the collet legs along the tapered surface to a position with a diameter where the taper is narrower and hence the initial position of the collet legs defines a narrower bore. If a larger diameter tube is inserted, this will simply push the collet to a wider portion of the taper against the action of the biasing member and the collet will function as described above in relation to the prior art. However, when a smaller diameter tube is inserted, the biasing means will act to maintain the collet at a smaller diameter portion of the taper thereby ensuring that the grip on the smaller diameter portion is not compromised.

In effect, the action of the biasing member is to maintain the collet legs at the part of the taper appropriate for the diameter of the tube to be inserted.

The coupling body may be provided with a seal arranged, in use, to seal on the outer diameter of the tube. Under such circumstances, this seal must be able to seal the different diameter tubes that can be gripped by the collet. The seal could be an O-ring made of a thicker and more resilient material than is conventional, or the coupling body could be designed to receive O-rings of different diameters. Alternatively, the seal may have a radially projecting lip that is deflected upon insertion of the tube by an amount proportional to the outer diameter of the tube.

Alternatively, the coupling could be designed as an inner diameter coupling. In this case, the coupling preferably comprises a tubular insert receivable in the end of the tube, the tubular insert having a first portion insertable into the tube and a second portion receivable in the coupling body, the first portion having a seal to seal, in use, with the inner diameter of the tube, and the second portion having a seal to seal with the coupling body. A variety of such inserts may be made available, each of which has the same diameter of the second portion such that it can seal with a standard seat in the coupling body, while the outer diameter of the first portion may vary between such inserts. Thus, for the larger diameter tube, a first insert is used with a larger diameter first portion to provide an adequate seal on the inner diameter of the tube while the second portion fits in the standard seat in the coupling body, the biasing member described above and provides adequate gripping on the larger diameter tube. For a smaller diameter tube, a second insert is used with a smaller outer diameter for the first portion to seal against the inner diameter of the tube. Again, the second portion seals with the standard seat in the coupling body and the biasing member ensures that the collet legs grip the smaller diameter tube as mentioned above.

Such a design of inner diameter connector is widely used with "composite" pipe in larger buildings such as office blocks. The composite pipe is multi-layer tubing with plastic (typically crossed-linked polyethylene PEX) on the inside and outside with a layer of aluminum in the middle. To stop the aluminum from corroding, the fitting needs to seal on the inner diameter of the pipe to keep the exposed aluminum layer at the end of the pipe dry.

This forms a second aspect of the present invention which is a kit comprising a coupling according to the first aspect of the present invention and at least two tubular inserts, each insert being receivable in the end of the tube, the tubular insert having a first portion insertable into the tube and a second portion receivable in the coupling body, the first portion having a seal to seal, in use, with the inner diameter of the tube, and the second portion having a seal to seal with the coupling body, wherein the first portions of the two inserts have different diameters.

This kit allows a user to be in a position to make fittings to pipes of a variety of diameter tubes without needing to carry a wide range of fittings. This is highly desirable when, as often happens, a user arrives at an installation site and only knows what type of tubes are present after they have exposed them.

Preferably, the kit contains more than two tubular inserts with first portions of different diameters to allow connection to a greater range of tubes. Also, preferably, the kit contains a double-ended coupling body and at least two inserts of each diameter of first portion to enable a double-ended connection to be made to a single tube.

Preferably, the kit also comprises at least one of a tool to restore the circular diameter of the tube, a tool to create a bevelled edge on the inner wall of tube and a tool to deburr the outer edge of the tube. A single tool may provide more than one of these functions.

Thus, an operator with this kit can arrive at a site without prior knowledge of the existing tubes and couplings. Having cut the tube he/she can reshape the cut end, create a bevelled edge and and/or deburr the pipe to prepare it for the new coupling. Then, despite only carrying a relatively small number of components he/she can make the new coupling.

The connector can incorporate a coupling according to the invention at one end and a standard connector on the other end. This can allow conversion from an inner diameter to an outer diameter system.

The biasing member may be positioned anywhere in which it is able to provide the necessary biasing force. For example, it may be outside the coupling body such that it acts between the end of the coupling body and a shoulder on the collet. However, preferably the biasing member is within the coupling body as there is a greater axial distance available here to accommodate the member. There are a number of ways in which the member can be configured. It may, for example, be a sleeve of elastomeric material. Alternatively, if there is a resilient O-ring within the coupling body, then a rigid sleeve could be provided between the seal and the end of the collet which compresses the seal to provide a biasing force which is transmitted via the sleeve to the collet legs.

However, preferably, the biasing member is a spring (e.g., a helically coiled spring, an undulating ring or a ring of opposed crosses) supported at one end within the coupling body and at the opposite end on the ends of the collet legs.

The coupling body is preferably provided with a locking cover which is received on the outside of the coupling body and is movable between a first position in which, with the tube inserted, axial movement of the collet is prevented and a second position in which, with the tube inserted, axial movement of the collet is permitted. This locking sleeve prevents accidental movement of the collet to a position in which the tube is dislodged.

The coupling body is preferably provided with a window, to allow for visual inspection of the tube when the tube is received within the coupling.

Preferably, the locking sleeve is configured to reveal the window in the first position and to cover the window in the second position. This allows the user to determine that the tube has been fully inserted into the correct position and also provides a visual indication of whether or not the locking sleeve is locked.

BRIEF DESCRIPTION OF THE DRAWINGS

An example of a coupling in according with the present invention will now be described with reference to the accompanying drawings, in which.

DETAILED DESCRIPTION OF THE PREFERRED EMBODIMENTS

Figure 1A:
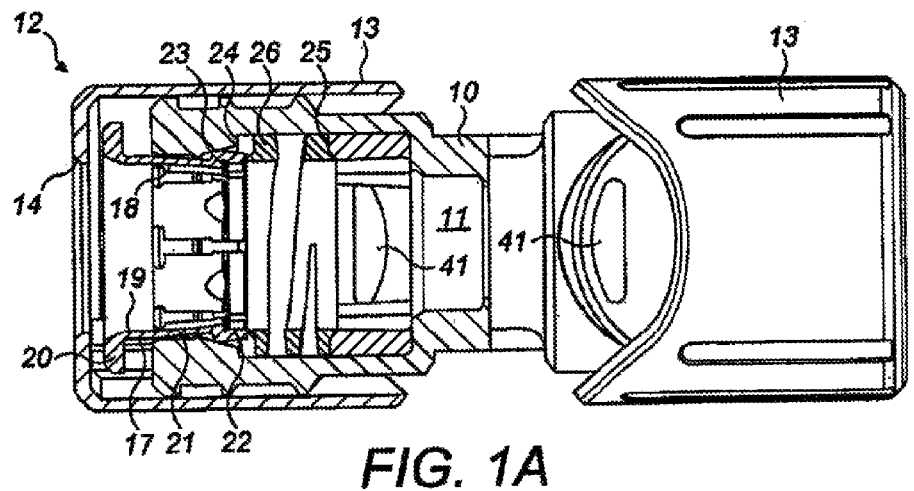
FIG. 1A is a partial axial section of a first example of a connector prior to use.

In all Figures, the connectors illustrated are in-line connections. For simplicity, only the left-hand side of the connector is shown in cross-section. The right-hand side of the connector may have the same configuration or may be provided with a different connection mechanism as necessary. The same connector design may equally be applied to elbow or T-couplings or tube closures where again one or more of the connections is as described and others may be of different designs as necessary.

The connector comprises a coupling body 10 having a through way 11 open at one end 12 to receive internally an end portion of a tube T and to receive externally a locking cap 13 which has a central opening 14 in line with the throughway 11.

A collet 17 is received in an open end 18 of the coupling body 10. The collet comprises an annular portion 19 extending through the opening 18 and having an outwardly projecting annular flange 20. The portion of the collet 17 extending into the throughway 11 in the coupling body 10 has axially extending resilient legs 21 which terminate in heads 22 with internal barbs or teeth 23 on the inner side thereof to grip the tube extending through the collet. Such collets are well known in the art.

A tapered cam surface 24 is formed within the coupling body 10 and tapers inwardly towards the open end 12. The heads 22 of the collet 17 engage with the tapered cam surface 24 such that they are compressed radially inwardly as the collet is drawn axially outwardly, thereby causing the barbs 23 to grip and engage the tube T extending through the collet 17. The greater the force trying to pull the tube T out of the connector, the more the collet 17 is pulled to the left in the Figures and the greater the degree of compression provided to the heads 23 by the tapered cam surface 24. The throughway 11 is provided with a shoulder 25 facing the open end 12 of the coupling body 10. A helical spring 26 is provided within the coupling body 10 surrounding the throughway 11 and resting on the shoulder 25 at one end and the heads 22 of the collet 17 at the opposite end. The spring 26 is in compression such that it urges the collet towards the open end 12 (i.e., to the left in the Figures). This has the effect of forcing the heads 22 to a narrower part of the tapered cam surface 24.

Figure 1B:
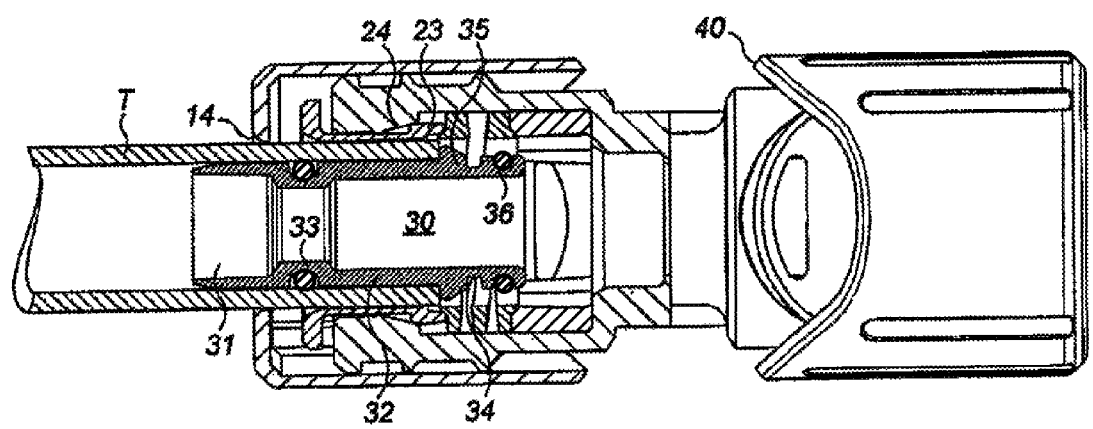
FIG. 1B is a view similar to FIG. 1A, with a tube partially inserted.

FIG. 1B shows the insertion of the tube T for an internal diameter (ID) connection. In this case, prior to being inserted into the coupling body 10, an insert 30 is fitted into the end of the tube T. The insert 30 has a throughway 31 which, upon insertion, is aligned with the throughway 11 in the coupling body. The insert 30 has a first portion 32 of narrower diameter which fits inside a tube T and is provided with an O-ring 33 to seal against the inner wall of the tube T. The second portion 34 of the insert 30 remains outside the tube. This second portion is provided with an annular flange 35 providing a shoulder which abuts against the end of the tube. Towards the end furthest from the end of the tube T, the second portion 34 is provided with an O-ring 36 which seals against the coupling body 10 as described below.

The tube T shown in FIG. 1B is the largest tube that the connector can accommodate as can be seen by the close fit between the tube T and the opening 14 on the locking cap 13. Because the tube T has a relative large diameter, upon insertion, it engages with the inner surface of the collet 17 and the barbs 23 and pushes the heads 22 of the collet to a position in which they are at or close to the widest part of the tapered surface 24. At this position, the collet and tapered surface are configured to provide the optimum force against withdrawal of a tube of larger diameter.

Figure 1C:
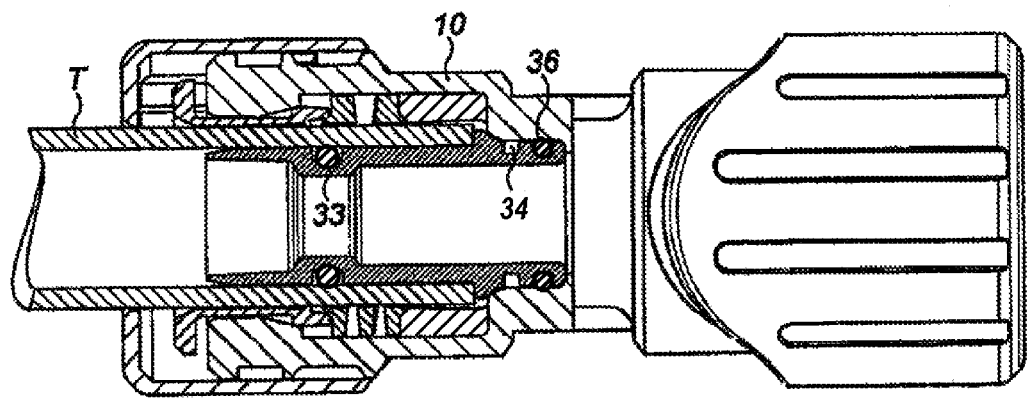
FIG. 1C is a view similar to FIG. 1B with the tube fully inserted.

When the tube T reaches the full inserted position as shown in FIG. 1C, the seal 36 seals against an annular wall in the coupling body 10. As will be appreciated from FIG. 1C, seals 33 and 36 prevent the fluid in the throughway 11 from contacting the end of the tube T.

Figure 1D:
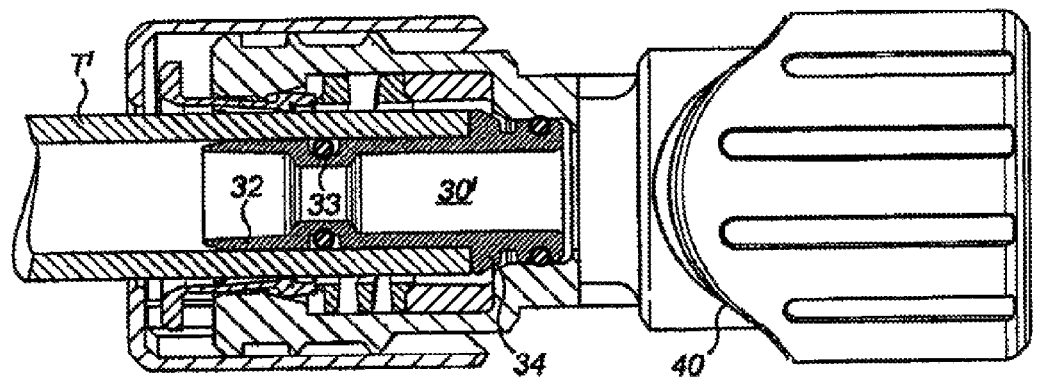
FIG. 1D is similar to FIG. 1C showing a smaller diameter tube fully inserted.

FIG. 1D shows the same connector being used for a smaller diameter tube T'. In this case, a smaller diameter insert 30' is used. This is the same as the insert 30 as previously described, except that the outer diameter of the first portion 32 and consequently the O-ring seal 33 are smaller so as to fit within and seal against the inner diameter of the smaller diameter tube T'. The second portion 34 is identical to the second portion described above and seals in the same manner.

Once the tube is fully in place, the locking sleeve 13 is rotated from the unlocked position shown in FIGS. 1A and 1B to the locked position shown in FIGS. 1C and 1D in which it has at least one port which is now in a position to obstruct the collet 17 as is known in the art. As best shown in the right-hand side of the Figures, the locking sleeve 13 has a scalloped lower edge 40 such that, in the unlocked position, a window 41 in the coupling body is exposed allowing a user to see whether or not the tube has been fully seated. In the locked position, the window 41 is covered as shown in FIGS. 1C and 1D providing a visual indication to the user that the coupling is locked.

The above described connector may be supplied as a part of a kit as will now be described with reference to FIGS. 2A-2C which, together, disclose the elements of the kit.

Figure 2B:
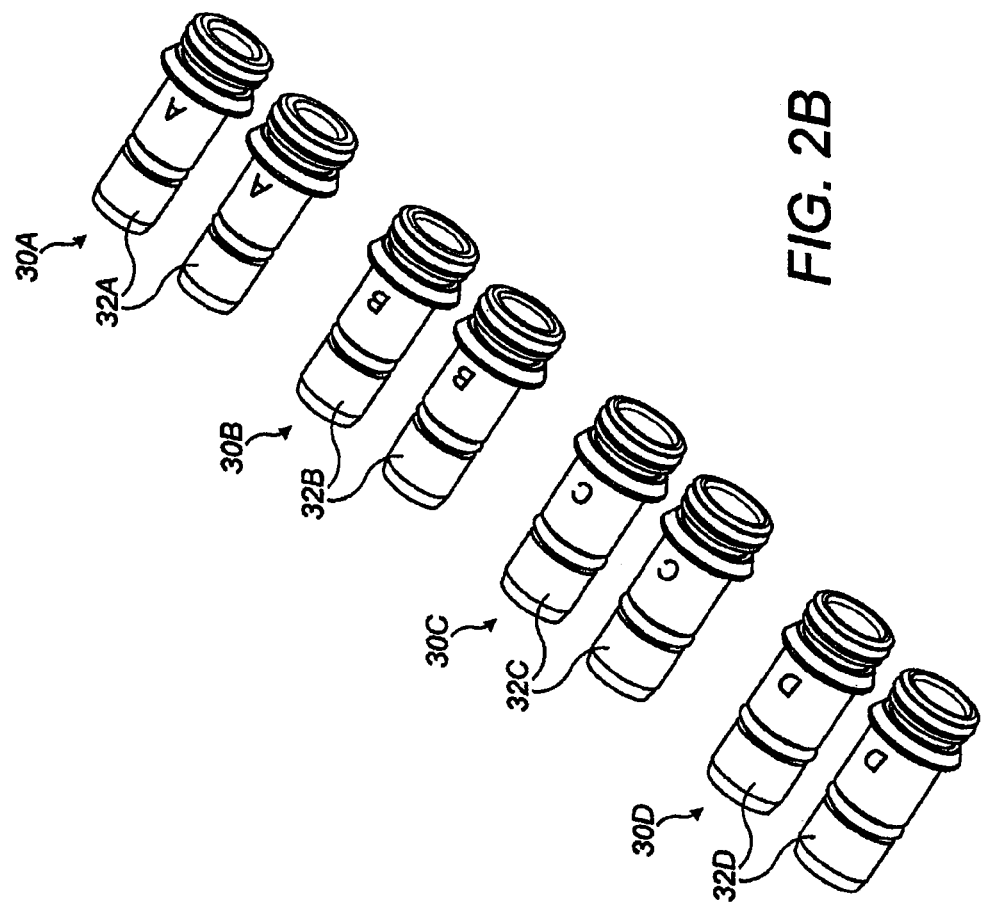
FIGS. 2A, 2B and 2C are perspective views of a kit according to the second aspect of the present invention.
Figure 2A:
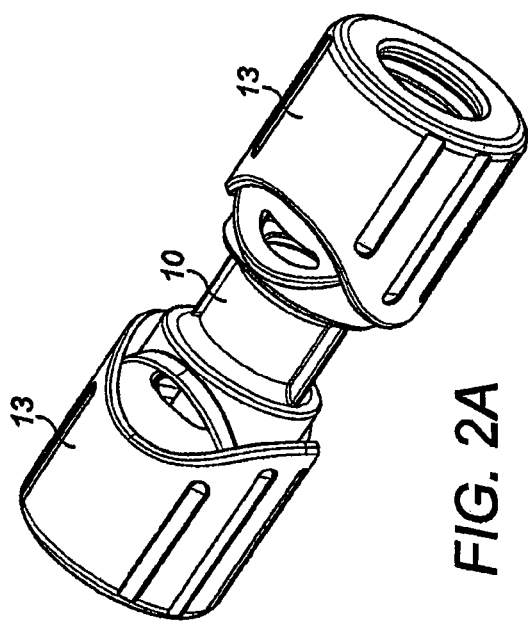

The connector shown in FIG. 2A is the connector described above. Also included as part of the kit are a number of inserts 30A-30D which correspond to the inserts 30 and 30' described above. The inserts come in pairs as identified by the matching letters, and each pair is identical except that the outer diameter of each first portion 32A-32D is different (increasing from 30A to 30D). In all cases, the second portion 34 is as previously described and fits within the connector shown in FIG. 2A.

Figure 2C:
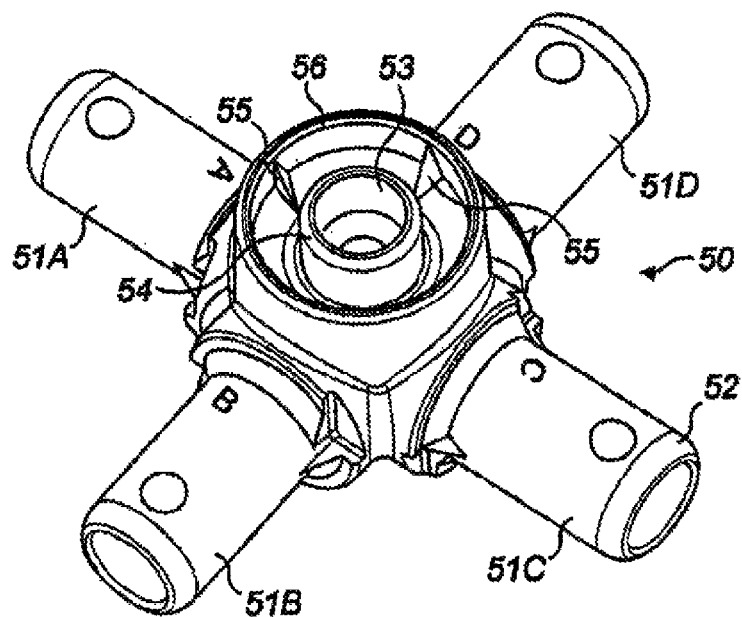

As shown in FIG. 2C, the kit is also supplied with a tool 50.

The tool 50 is provided with four projecting tubular elements 51A-51B arranged in a cruciform. Each of the elements is labelled with a letter A-D which corresponds to the corresponding letter on the inserts. The outermost end of each element has a bevelled outer edge 52 which provides a lead-in surface. At the opposite end, each element has a pair of cutters 53. There may be more or less than four sets of inserts 30 in which case, the number of tubular elements may be changed accordingly.

When retro-fitting a connector, the user will first cut the existing tube and this will generally cause the end of the cut tube to be squashed to some extent. The user can determine visually the rough size of the inner diameter of the cut tube and can then insert the appropriate tubular element 51A-51B. The bevelled edge 52 will facilitate the insertion of the tubular element into the cut end of the tube, and the continued insertion will restore the circularity of the tube in the vicinity of the cut end. The tube is pushed fully onto the tubular element such that it engages cutters. Rotation of the tube will create a chamfer on the inner diameter of the tube.

If the user has selected an extension which is too big for the inner diameter of the tube, it will not fit, while an extension which is too small will feel loose and will encourage them to try a larger diameter extension to see if this will fit.

The tool 50 is also provided with an upwardly facing surface with reference to FIG. 2C with an inner cylindrical extension 53 again having a bevelled outer edge 54. This bevelled edge 54 provides a lead in into the tube. The inner cylindrical extension 53 is surrounded by a number of cutters 55, two of which are shown in FIG. 2C. These are supported by an outer cylinder 56. These cutters 55 are positioned to engage with the outer edge of the cut tube once it has been restored to its circular shape, such that rotation of the tool about the axis of the cylindrical extension 53 on which it is located causes the cutters 55 to scrape the outer edge of the tube thereby deburring the tube. The bevelled edge 54 and cutters 55 may be designed such that they fit all diameters of the tube with which the kit is designed to be used. Alternatively, the bevelled edge 54 and cutters 55 on one side of the tool may be sized to deal with some of the sizes of the inserts, while the opposite side of the tool may have a similar arrangement sized to deal with the remaining sizes of insert.

Armed with the kit shown in FIGS. 2A-2C, the user can arrive at a site without any knowledge of the diameters of the tubes that they will be dealing with. Having cut out an existing connector, the tool 50 can be used to restore the circular shape of the tube ends and also to provide the user with an idea of which size of inserts they need to use to re-make the connection. The bevelled edge 54 and cutters 55 enable them to quickly clean the end of the pipe and prepare it to receive the inserts whereupon they can insert the appropriate insert into the cut ends of the pipe and attach the connector as described above.

Figure 3:
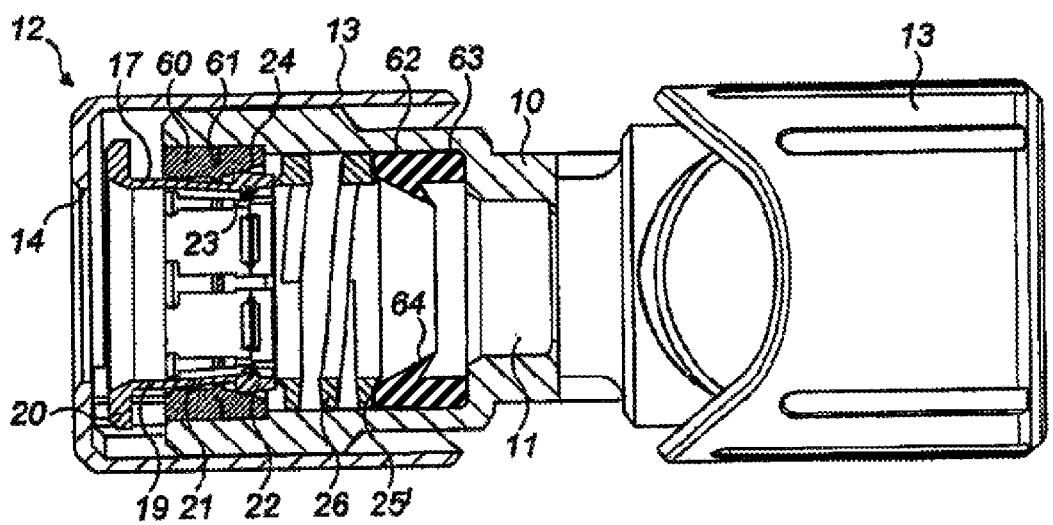
FIG. 3 is a partial axial section similar to FIG. 1 showing a second example of a connector.

A second example of a connector is shown in FIG. 3.

This has a number of components that are the same as, or similar to those in the first example, and the same reference numerals have been used to designate the same components where appropriate.

The example of FIG. 1 was for an ID connection, whereas the example of FIG. 3 is for an outer diameter (OD) connection.

As shown in FIG. 3, a cartridge ring 60 forms part of the coupling body 10 and is held in place by anchoring teeth 61. It could equally be welded in place.

The main difference in the second example is that there is now an annular seal 62 within the coupling body. This is positioned distally of the helical spring 26 to surround the throughway 11 and sits on a shoulder 63 which faces the open end 12. The end of the annular seal 62 facing the open end forms the shoulder 25' on which the spring 26 sits.

The annular seal 62 has an annular lip 64 which projects radially inwardly and is inclined away from the open end 12. The lip 64 tapers inwardly towards its radially innermost edge.

Upon insertion of a tube, the operation of the collet 17 and spring 26 is as previously described.

When a tube with a relatively large outer diameter is inserted, the lip 64 is deformed radially outwardly to a relatively large extent. On the other hand, a relatively small tube would provide a relatively small deflection of the lip 64. In either case, the direction in which the lip projects and the tapering nature of the lip ensure that an adequate seal is maintained for a range of tube diameters.

What is claimed is:

1. A tube coupling to receive and hold a tube, the coupling comprising:

a coupling body having a throughway open at one end that is configured to receive a portion of the tube;

a collet in an open end of the coupling body and having an outwardly projecting annular flange at a first end outside of the coupling body and at a second end opposite to the first end having a plurality of legs with outer surfaces that engage with a tapered surface in the coupling body which urges the legs inwardly to resist withdrawal of the tube when the portion of the tube is received within the throughway of the coupling body;

a biasing member which provides a biasing force that urges the legs axially onto the tapered surface when the coupling body is free of the tube; and at least one tubular insert, the tubular insert having a first portion configured to be insertable into the portion of the tube and a second portion received in the coupling body, the first portion having a seal to seal with an inner diameter of the portion of the tube when the first portion is inserted into the portion of the tube, and the second portion having a seal sealed with the coupling body.

2. The tube coupling according to claim 1, wherein the biasing member is within the coupling body.

3. The tube coupling according to claim 2, wherein the biasing member is a spring supported at one end within the coupling body and at an opposite end on the plurality of legs of the collet.

4. The tube coupling according to claim 1, wherein the coupling body is provided with a locking cover which is received on an outside surface of the coupling body and is movable between a first position in which, with the tube inserted, axial movement of the collet is prevented and a second position in which, with the tube inserted, axial movement of the collet is permitted.

5. The tube coupling according to claim 4, wherein the coupling body is provided with a window, to allow for visual inspection of the tube within the coupling body.

6. The tube coupling according to according to claim 5, wherein the locking cover is configured to reveal the window in the first position and to cover the window in the second position.

7. A kit comprising:
a coupling according to claim 1; and
at least two tubular inserts, each insert being receivable in the end of the tube, wherein the first portions of the two inserts have different diameters.

8. The kit according to claim 7, wherein the kit contains more than two tubular inserts with first portions of different diameters.

9. The kit according to claim 7, wherein the kit comprises:
the coupling comprising a double-ended coupling body and
at least two further tubular inserts wherein first portions of the at least two further tubular inserts have different diameters.

10. The kit according to claim 7, further comprising at least one of a tool to restore the circular diameter of the tube, a tool to create a bevelled edge on an inner wall of the tube and a tool to deburr an outer edge of the tube.

11. A tube coupling to receive and hold a tube, the coupling comprising:
a coupling body having a throughway open at one end that is configured to receive a portion of the tube;

a collet in an open end of the coupling body and having an outwardly projecting annular flange at a first end outside of the coupling body and at a second end opposite to the first end having a plurality of legs with outer surfaces that engage with a tapered surface in the coupling body which urges the legs inwardly to resist withdrawal of the tube when the portion of the tube is received within the throughway of the coupling body; and a biasing member which provides a biasing force that urges the legs axially onto the tapered surface when the coupling body is free of the tube;

wherein the coupling body is provided with a locking cover which is received on an outside surface of the coupling body and is movable between a first position in which, with the tube inserted, axial movement of the collet is prevented and a second position in which, with the tube inserted, axial movement of the collet is permitted.

* * * * *